Jan. 29, 1935.  R. I. MUNDER  1,989,109
SYNCHRONIZED FLASH LAMP AND CAMERA APPARATUS
Filed July 26, 1933
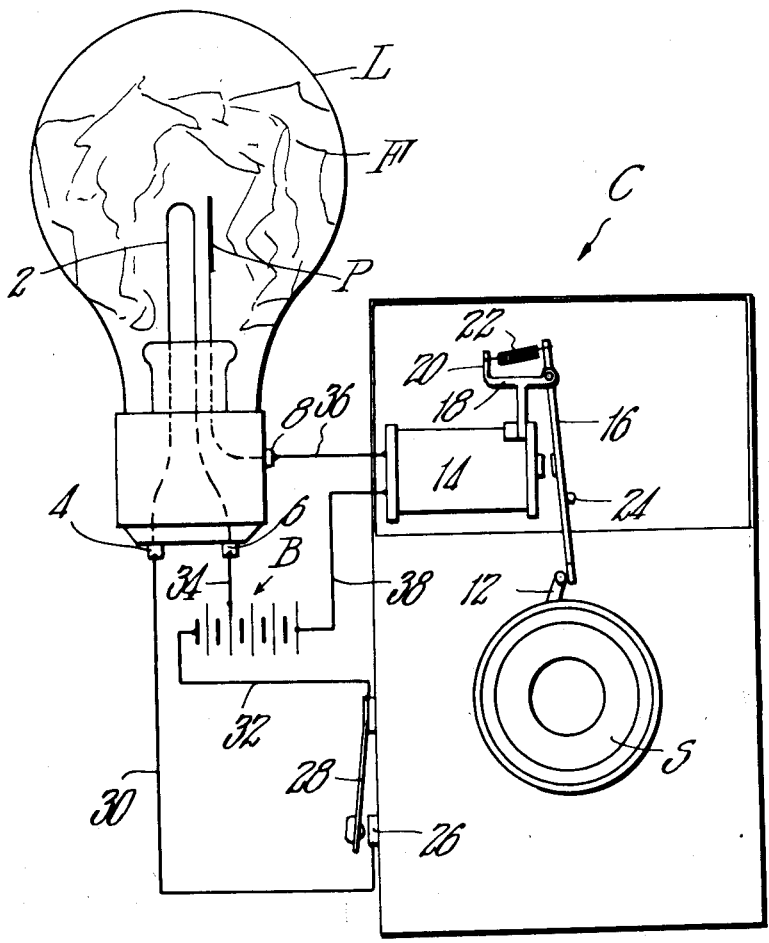
INVENTOR.
Rushworth I. Munder
BY Walter C. Ross.
ATTORNEY.

Patented Jan. 29, 1935

1,989,109

UNITED STATES PATENT OFFICE 1,989,109

SYNCHRONIZED FLASH LAMP AND CAMERA APPARATUS

Rushworth I. Munder, Springfield, Mass.

Application July 26, 1933, Serial No. 682,298

5 Claims. (Cl. 67—29)

This invention relates to improvements in photographic apparatus and is directed more particularly to improved flash lamps and means of synchronizing the operation of the shutter of the camera and the firing of a photo flash lamp.

The invention has for its principal object the provision of an improved flash lamp and means whereby the firing of the lamp will operate the shutter of a camera associated therewith so that any lag, ordinarily a detriment to the simultaneous operations thereof, is overcome. The apparatus of the invention is simple in form so as to be economical of manufacture and is efficient in its operation, as will all appear.

Various novel features and advantages of the invention will appear from the following description of the preferred form thereof, reference being had to the accompanying drawing, wherein:

The figure is a side elevational view of a camera and photo-flash lamp with the novel features of the invention associated therewith.

Referring now to the drawing more in detail, the invention will be fully described.

As one feature of the invention a photo-flash lamp L has a filament 2 leading upwardly from a base 3 and is connected to terminals 4 and 6 at the lower side thereof. A plate P which is preferably of metal is disposed in the lamp adjacent the filament 2 and is suitably supported and connected to a terminal 8 conveniently located as on a side of the base.

The lamp preferably contains a suitable gas such as oxygen at some suitable pressure and has foil F of aluminum or some similar oxidizable substance which surrounds the filament and plate. This foil is adapted to be ignited and combustion takes place accordingly as the filament is energized by electrical current. This causes the desired flash.

A source of electrical energy such as a battery B is connected to the terminals 4 and 6 by wires 30 and 34.

When ignited, the foil flashes so as to create a conductive atmosphere in the lamp or at least a condition is created whereby current flows between the filament 2 and plate P. I make use of the tendency of the current to flow between the filament and plate as will later appear.

A camera is shown at C which has a shutter S of usual type whereby the camera lens may be exposed to light. The shutter has a movable operating member 12 associated therewith.

Associated with the camera is a relay or magnet 14 connected by wires 36 and 38 respectively to the terminal 8, to which the plate P is connected, and to one side of the battery B. In this way, the relay, battery, plate and filament are included in a circuit which, when the filament is energized to flash the foil, is momentarily closed whereby the magnet 14 is energized by the operation of the flash lamp.

An armature of common form, as shown, is operable when current flows through the relay to actuate a movable member 16. Associated in some manner with the relay 14, is a bracket, such as 18. The bracket 18 has an arm 20, between which and movable member 16 is preferably disposed a spring such as 22. The movable member 16 is pivoted to the bracket 18 and is adapted to contact with and actuate the member 12 associated with the shutter S. Since the spring urges the member 16 in one direction, the member 16 is normally held out of contact with the magnet. A stop such as 24 may be provided to prevent the arm's swinging too far away from the unit 14.

The operating arm 12 of the shutter is so arranged that when it is moved in a certain direction the shutter is opened to uncover the lens. The member 16 is adapted to be moved from the position shown to contact with and move the arm 12, so that when the circuit including the unit 14 is energized by the ignition of the foil the magnet attracts the member 16 sufficiently to move the operating member in the certain direction and thus open the shutter. In this way, the flash occurs practically simultaneously with the operation of the shutter and any lag is obviated.

The terminal 4 of the lamp is connected as by a wire 30 to a terminal such as 26 of a switch. The switch includes a contact member 28 which is arranged to contact with the terminal 26 and is connected by a wire 32 to a side of the battery B. In this way, a second complete circuit is created consisting of the lamp, battery and switch.

It will be observed that the shutter is operable substantially simultaneously with the flashing of the oxidizable substance in the flash lamp whereby the lagging tendency is overcome and efficient operation is provided at high shutter speed.

Having described the invention in the form at present preferred, what I now desire to claim and secure by Letters Patent of the United States is:

1. A synchronized flash lamp and camera apparatus comprising in combination, a flash lamp having a filament and a plate member and including an oxidizable substance adapted on flashing of the substance to pass current between said filament and plate, a shutter provided with an operating member, a unit adapted to be energized having a movable part for actuating said operating member of the shutter, a circuit-closing switch, a source of energy, a circuit including said filament, source of energy and switch, and a circuit including said filament, plate, source of energy and unit, all adapted and arranged whereby the flashing of said lamp will bring about the operation of said shutter.

2. A synchronized flash lamp and camera apparatus comprising in combination, a flash lamp having a filament and a plate member and including an oxidizable substance and adapted on flashing of the substance to pass current between said filament and plate, a shutter provided with an operating member, a unit adapted to be energized having a movable part for actuating said operating member of the shutter, a circuit-closing switch, a source of energy, a circuit including said filament, source of energy and switch, and a circuit including said filament, plate, source of energy and unit, the said circuits being separate so that one circuit is energized by the other, all adapted and arranged whereby the flashing of said lamp will bring about the operation of said shutter.

3. A synchronized flash lamp and camera apparatus comprising in combination, a flash lamp having a filament and a plate member and including an oxidizable substance and adapted on flashing of the substance to pass current between said filament and plate, a shutter provided with an operating member, a unit adapted to be energized having a movable part for actuating said operating member of the shutter, a circuit-closing switch, a source of energy, a circuit including said filament, source of energy and switch, and a circuit including said filament, plate, source of energy and unit, the said circuits being separate so that one circuit is energized by the other, all adapted and arranged whereby the flashing of said lamp will close said second-named circuit and energize said relay and bring about the operation of said shutter.

4. A flash lamp of the class described comprising in combination, a gas-filled bulb, a base therefor, separate filament and plate elements supported by said base, contact members outside said base connected to said filament and plate elements, a substance in said bulb adapted to flash when said filament is energized, all adapted and arranged whereby the said substance may be flashed by said filament when energized and electric energy may pass between said filament and plate.

5. A synchronized flash lamp and camera apparatus comprising in combination, a flash lamp enclosing separate plate and filament members and an oxidizable substance, a camera having a movable shutter actuating member, an electrical unit for operating said actuating member, a source of energy for said filament, a circuit including said source of energy and said filament, circuit closing means therefor, and a second source of energy connected to said filament, plate and electrical unit, all adapted and arranged whereby as the first-named circuit is closed the filament of said lamp is energized to bring about flashing of the oxidizable substance to create a conductive atmosphere whereupon current passes between said filament and plate to energize said electrical unit and operate said electrical unit to actuate said shutter simultaneously with the flashing of said oxidizable substance.

RUSHWORTH I. MUNDER.